US006035507A

United States Patent [19]

Bianchi

[11] Patent Number: 6,035,507

[45] Date of Patent: Mar. 14, 2000

[54] METHOD FOR COORDINATING A ROTOR AND HUB

[75] Inventor: Michael Bianchi, Canton, Mich.

[73] Assignee: Kelsey-Hayes Company, Livonia, Mich.

[21] Appl. No.: 09/159,156

[22] Filed: Sep. 23, 1998

Related U.S. Application Data

[63] Continuation-in-part of application No. 08/799,837, Feb. 13, 1997, abandoned.

[51] Int. Cl.[7] ...................................................... B23Q 17/00

[52] U.S. Cl. ................... 29/407.05; 29/407.1; 188/18 A; 280/86.751

[58] Field of Search ................................ 29/802, 894.36, 29/407.01, 407.04, 407.05, 407.09, 407.1; 188/18 A, 218 XL; 33/203, 203.18; 280/86.753, 86.751

[56] References Cited

U.S. PATENT DOCUMENTS

| | | |
|---|---|---|
| 4,297,877 | 11/1981 | Stahl . |
| 4,400,037 | 8/1983 | Gentry . |
| 4,541,162 | 9/1985 | Halvin . |
| 4,600,090 | 7/1986 | Feldmann et al. . |
| 4,741,194 | 5/1988 | Kozyra et al. . |
| 5,074,578 | 12/1991 | Grove et al. . |
| 5,108,156 | 4/1992 | Bell . |
| 5,193,274 | 3/1993 | Bell et al. . |
| 5,667,313 | 9/1997 | Kapaan et al. . |
| 5,918,707 | 7/1999 | Saunders, III ........................ 188/18 A |

*Primary Examiner*—David P. Bryant
*Attorney, Agent, or Firm*—MacMillan, Sobanski & Todd, LLC

[57] ABSTRACT

A method for mounting a production rotor (20) to a hub (22) of a wheel assembly (10) for a vehicle. The rotor (20) comprises a disc (32) having braking surfaces (24, 26). The rotor (20) also has a central plate (28) that is offset from the disc (32) and rotor studholes (30) extending through the central plate (28). The hub (22) has a flange (34) and studs (36) for attaching the hub (22) to the rotor (20). The method comprises the steps of clamping the central plate (28) of the production rotor (20) to a gage hub (122); and measuring the axial displacement (dt) of one of the braking surfaces (24, 26) from a free state plane (A). The production rotor (20) is marked to indicate the rotor position of one of the maximum and minimum displacement (dt) thereof. Also included are the steps of clamping the production hub flange (34) to a gage rotor (120) having gage braking surfaces (124, 126); and measuring the axial displacement (dh) of the gage braking surface (124, 126) from a free state plane (B). The production hub flange (34) is marked at a hub position radially aligned with one of the maximum and minimum displacements (dh) of the gage braking surface (124, 126). Thereafter, the method is completed by angularly positioning the rotor and hub positions in a predetermined relationship to one another and assembling the production rotor (20) onto the production hubs (22) to thereby minimize runout.

4 Claims, 2 Drawing Sheets

METHOD FOR COORDINATING A ROTOR AND HUB

RELATED APPLICATIONS

This application is a continuation-in-part of U.S. Ser. No. 08/799,837 filed Feb. 13, 1997, now abandoned.

TECHNICAL FIELD

The subject invention relates to a method for minimizing runout of a brake rotor in a wheel assembly for a vehicle.

BACKGROUND OF THE INVENTION

A conventional wheel assembly includes a rotor and a hub. The rotor is fixedly mounted to the hub and has a disc which is engaged by friction pads to brake the vehicle. Over time the brake assembly wears. It is well known that brakes wear prematurely due to lateral runout. Lateral runout is the result of the rotor and the hub being out of alignment.

Premature brake wear can be reduced by minimizing lateral runout. The rotor and hub need to be aligned when they are mounted so that the hub is parallel to the rotor. However, due to tolerances in the hub and the rotor they are inherently not parallel to each other when assembled. Therefore, when the rotor and the hub are mounted, they are misaligned.

Known means of mounting the rotor to the hub have not addressed the need to mount the rotor and the hub in alignment with each other. There remains an opportunity to provide a method for mounting the hub and the rotor in alignment with each other in a way that minimizes runout and prevents the premature wear of brakes. The object of the subject invention is to provide a method for mounting the hub and the rotor together in alignment to minimize runout.

SUMMARY OF THE INVENTION AND ADVANTAGES

A method for mounting a production rotor to a hub of a wheel assembly. The rotor comprises a disc having a front and a rear disc braking surfaces. A central plate is offset from the disc of the rotor and has a bottom face. Rotor studholes extend through the central plate. The hub has a flange and studs for attaching the hub to the rotor by inserting the studs of the hub into the rotor studholes. The method comprises the steps of clamping the central plate of the production rotor to a gage hub and measuring the axial displacement of one of the braking surfaces from a free state plane. The production rotor is marked to indicate the rotor position of one of the maximum and minimum displacement thereof. Also included are the steps of clamping the production hub flange to a gage rotor having gage braking surfaces and measuring the axial displacement of the gage braking surface from a free state plane. The production hub flange is marked at a hub position radially aligned with one of the maximum and minimum displacements of the gage braking surface. Thereafter, the method is completed by angularly positioning the rotor and hub positions in a predetermined relationship to one another and assembling the production rotor onto the production hubs to thereby minimize runout.

This assembly is arranged for mounting the rotor and the hub in alignment with each other and for extending the life of the friction pads of a brake assembly by reducing the amount of wear on the friction pads due to the rotor and the hub being misaligned, i.e., lateral runout.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 2:
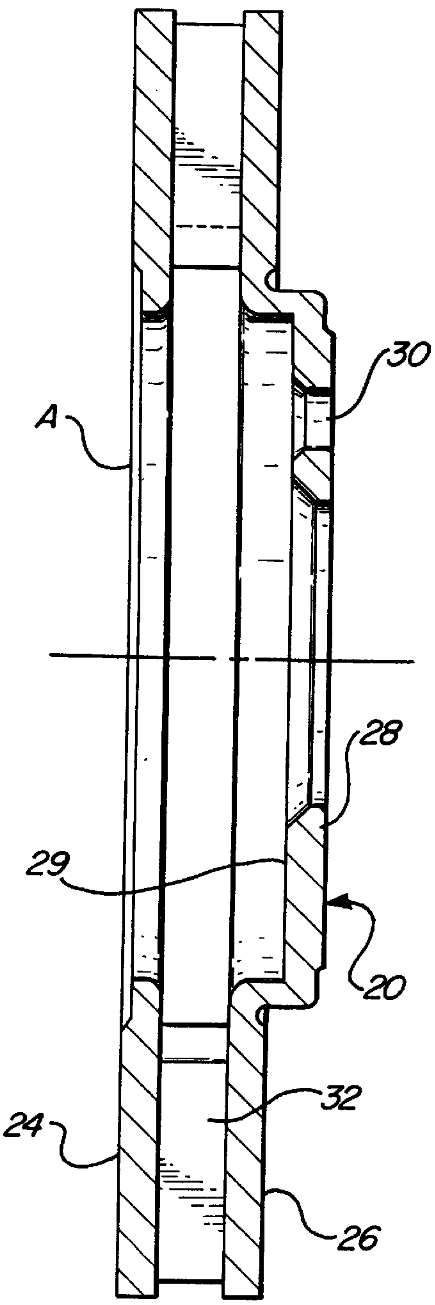
FIG. 2 is cross sectional view of a production rotor.

Referring to the Figures, wherein like numerals indicate like or corresponding parts throughout the several views, but the numbers increased by one hundred for gage components, a wheel assembly is generally shown at 10 and 110. A production rotor is generally indicated at 20 in FIGS. 2 and 3 and includes a disc 32 having front and rear braking surfaces 24, 26 disposed radially and offset from a central plate 28. The central plate 28 has a bottom face 29 and studholes 30 extending therethrough.

Figure 1:
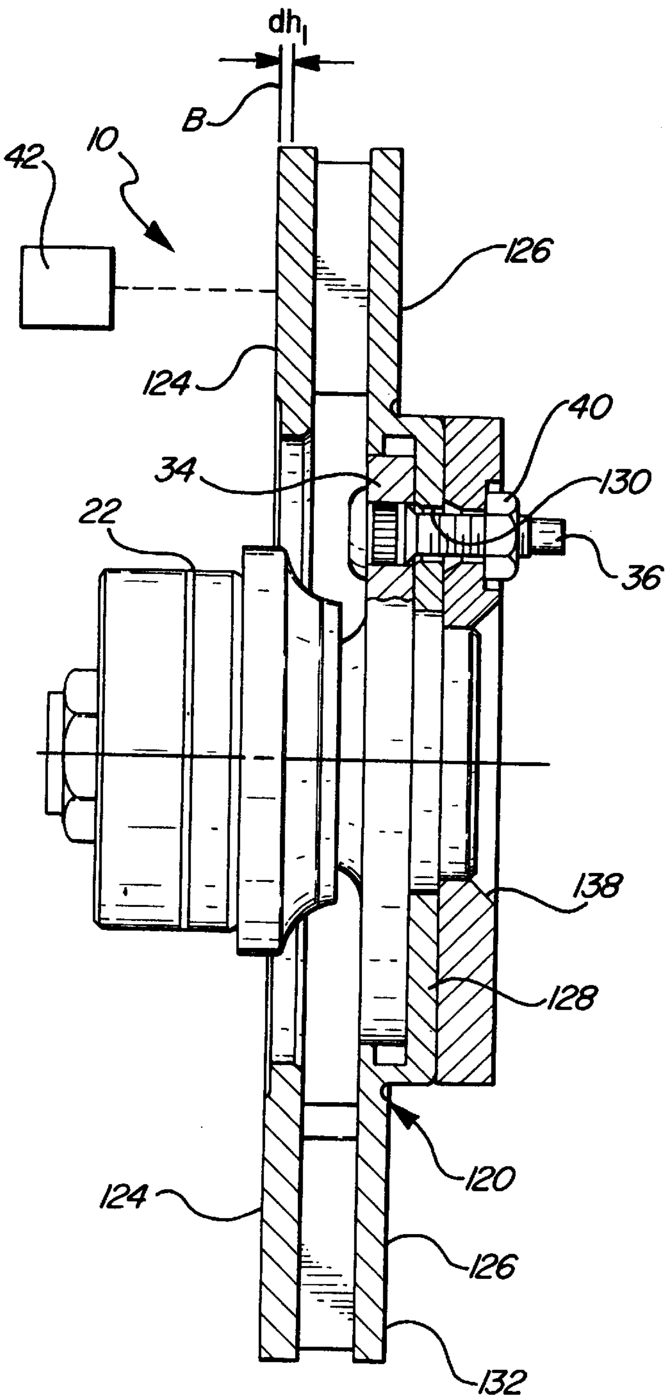
FIG. 1 is a cross sectional view of a wheel assembly including a gage rotor, a production hub and a clamp plate.

A production hub 22 is shown in FIG. 1 and includes a flange 34, supporting studs 36 and stud nuts 40.

Also shown in FIG. 1 is a gage rotor, generally indicated at 120, which is machined to very close and known tolerances. The plane B of either one or both of the gage braking surfaces 124 or 126 is very accurately positioned relative to the center plate 128 and the stud holes 130 therein.

Figure 3:
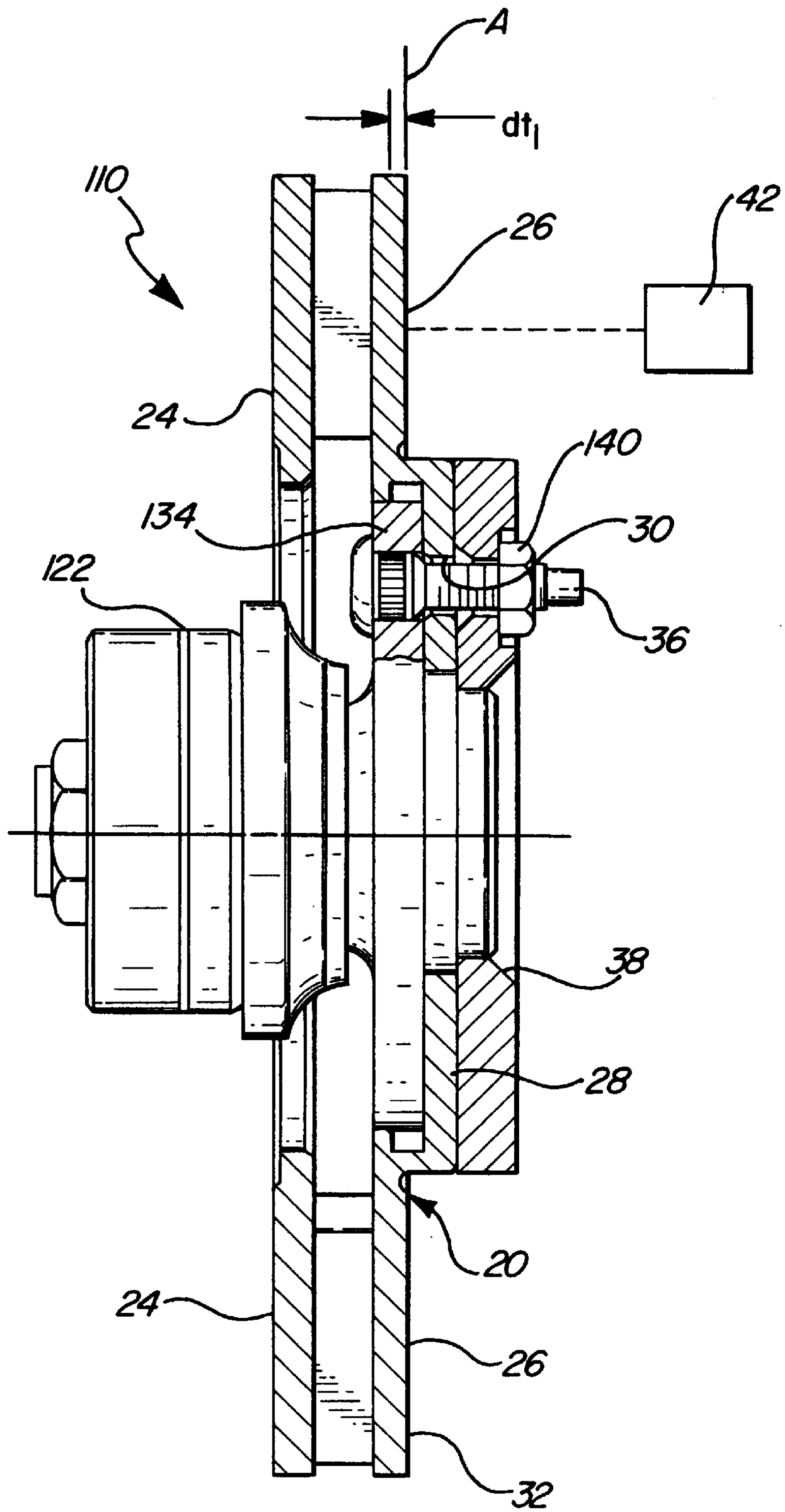
FIG. 3 is a cross sectional view of a wheel assembly, including a production rotor, a gage hub and clamp plate.

In an analogous fashion, gage hub 122 is shown in FIG. 3 mounted to a production rotor 20. The mounting flange 134 of the gage hub 122 is very precisely positioned and held against the central plate 28 of the production rotor 20 by gage stud nuts 140. The purpose of clamping the central plate 28 of the production rotor 20 to the gage flange 134 is to determine the axial displacement dt of at least one of the braking surfaces 24, 26 thereof from a free state plane A. A laser or other measuring device 42 may be used to measure the displacement dt of the braking surface 26 from a free state plane A before the stud nuts 140 are tightened and the tightened condition simulating forces in the operating condition attached to a production hub. The displacement dt may be plus or minus and either the maximum or minimum displacement dt can be determined by rotating the production rotor 20.

The production rotor 20 is then marked at a rotor position around the circle of the center plate 28, preferably by marking a stud hole 30.

As alluded to above, in a separate operation, as shown in FIG. 1, the displacement dh of the braking surface 124 or 126 is measured from a free state plane B upon clamping to a gage rotor 122 by stud nuts 40. Again, either the maximum or minimum axial displacement dh is determined and a hub position radially aligned with that displacement is marked annularly on the production hub 22, preferably at one of the studs 36.

Thereafter, the production hub and rotor positions, which have been marked, are positioned in a predetermined relationship to one another with the production rotor 20 then assembled to the production hub 22 whereby the displacements of the production rotor dt and hub dh cancel one another to minimize runout.

The method includes the step of clamping the hub flange 34 to the gage rotor 120. The gage rotor 120 has a gage braking surface 124 in a predetermined position. The displacement dh of the gage braking surface 124 is measured from the predetermined position at a plurality of positions about the hub 22. The hub flange 34 is marked at an indicator or hub position radially aligned with one of the maximum and minimum displacements dh of the braking surface 124. The gage rotor 120 has a gage braking surface 124 with a zero displacement dh in the free state, i.e., at plane B. In other words, the gage rotor 120 is precisely machined and calibrated to have zero lateral runout. Therefore, the gage rotor 120 and its braking surface 124 are displaced dh in proportion to the tolerances in the production hub 22, i.e., the deviations from perfect in the hub flange 34. After the hub studs 36 are inserted through gage studholes 130 extending through the gage rotor 120, the hub flange 34 is clamped to the gage rotor 120 by a clamp plate 138 placed over the opposite side of the gage rotor 120 from the hub flange 34. Nuts 140 are placed on the hub studs 36 and threaded into clamping relationship 20 with the clamp plate 38. In this manner, the hub 22 tolerances move the braking surface 124 of the gage rotor 120 various displacements dh circumferentially around the gage rotor 120 and either a minimum or maximum displacement dh of the braking surface 124 is noted and the hub 22 is marked circumferentially at one of the studs 36. The stud 36 that is marked represents the stud 36 that is radially aligned or closest to the circumferential position of the noted displacement dh.

The method also includes the step of assembling the hub 22 to the production rotor 20 after the hub 22 and rotor 20 have been calibrated. The calibrated indicator position on the hub 22 is placed in a position relative to the calibrated indicator position on the rotor 20 based on a predetermined relationship between the marked studhole 30 and the indicator position on the hub 22 to minimize runout. In that predetermined relationship, the markings, studhole and stud are usually either aligned or 180° apart, depending upon the combination of maximum or minimum dt and dh.

The studhole 130 aligned with maximum displacement dt is marked and the hub flange 34 is marked at the indicator position aligned with the minimum displacement dh, and these two displacements are aligned when assembling the production rotor 20 to the production hub 22 to cancel one another and minimize runout.

Accordingly, the manufacturing tolerances in the rotor 20 can be measured to offset the manufacturing tolerances in the hub 22 and produce an assembly 10 with minimum runout.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A method for mounting a production rotor (20) to a production hub (22) of a wheel assembly (10) wherein the rotor (20) comprises a disc (32) having front and rear disc braking surfaces (24, 26), and an offset central plate (28) having a bottom face (29), and rotor studholes (30) extending through the central plate (28), and wherein the hub (22) has a flange (34) and studs (36), comprising the steps of:

clamping the central plate (28) of the production rotor (20) to a gage hub (122);

measuring the axial displacement (dt) of one of the braking surfaces (24, 26) from a free state plane (A);

marking the production rotor (20) to indicate the rotor position of one of the maximum and minimum displacement (dt) thereof;

clamping the production hub flange (34) to a gage rotor (120) having gage braking surfaces (124, 126);

measuring the axial displacement (dh) of one of the gage braking surfaces (124, 126) from a free state plane (B);

marking the production hub flange (34) at a hub position radially aligned with one of the maximum and minimum displacements (dh) of the one gage braking surface (124, 126); and angularly positioning the rotor and hub positions in a predetermined relationship to one another and assembling the production rotor (20) onto the production hubs (22) to thereby minimize runout.

2. The method as set forth in claim 1 including clamping the hub flange (34) to the gage rotor (120) by placing a clamp plate (38) over the opposite side of the gage rotor (120) from the hub flange (34) and placing nuts on the hub studs (36).

3. The method as set forth in claim 1 including marking the rotor position at a studhole in the production rotor (20).

4. A method as set forth in claim 3 including marking the hub position at a stud (36).

* * * * *